United States Patent
Boyd et al.

(10) Patent No.: US 12,495,230 B2
(45) Date of Patent: Dec. 9, 2025

(54) RANGELESS FAILOVER IN PON PROTECTION SWITCHING

(71) Applicant: Ciena Corporation, Hanover, MD (US)

(72) Inventors: Edward Wayne Boyd, Gilbert, AZ (US); James A. Teborek, Mansfield, MA (US); Jean-Christophe Marion, Petaluma, CA (US); Mark Edward Laubach, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 254 days.

(21) Appl. No.: 18/513,982

(22) Filed: Nov. 20, 2023

(65) Prior Publication Data
US 2025/0168540 A1    May 22, 2025

(51) Int. Cl.
*H04Q 11/00* (2006.01)

(52) U.S. Cl.
CPC ..... *H04Q 11/0067* (2013.01); *H04Q 11/0066* (2013.01); *H04Q 2011/0086* (2013.01); *H04Q 2011/0088* (2013.01)

(58) Field of Classification Search
CPC .................................................. H04Q 11/0067
See application file for complete search history.

(56) References Cited

U.S. PATENT DOCUMENTS

| | | |
|---|---|---|
| 5,859,716 A | 1/1999 | O'Sullivan et al. |
| 5,959,749 A | 9/1999 | Danagher et al. |
| 6,028,860 A | 2/2000 | Laubach et al. |
| 6,081,533 A | 6/2000 | Laubach et al. |
| 6,111,676 A | 8/2000 | Lemus et al. |

(Continued)

FOREIGN PATENT DOCUMENTS

| | | |
|---|---|---|
| CN | 1 866 804 A | 11/2006 |
| CN | 103 139 669 A | 6/2013 |

OTHER PUBLICATIONS

International Telecommunication Union, Telecommunication Standardization Sector, "Draft revised Supplement 51 to ITU-T G-series Recommendations," (for Agreement Feb. 26, 2016), Study Group 15, TD 527 (PLEN/15), 37 pages.

(Continued)

*Primary Examiner* — Shi K Li
(74) *Attorney, Agent, or Firm* — Baratta Law PLLC; Lawrence A. Baratta, Jr.

(57) ABSTRACT

Rangeless failover in Passive Optical Network (PON) protection switching is implemented by an Optical Line Terminal (OLT) that includes a transmitter configured to connect a plurality of Optical Network Units (ONUs) on a downstream channel; a receiver configured to connect the plurality of ONUs on an upstream channel; and circuitry communicatively coupled to the transmitter and the receiver, wherein the circuitry is configured to, responsive to protection switch from a primary OLT, enable the transmitter on the downstream channel, and utilize a Dynamic Bandwidth Assignment (DBA) function on the downstream channel with a guard time that includes a normal guard time plus a differential time added thereto. The guard time is larger than a guard time used by the primary OLT prior to the protection switch. The differential time can be based on a differential between a closest ONU and farthest ONU, relative to the primary OLT, prior to the protection switch.

20 Claims, 5 Drawing Sheets

(56) References Cited

U.S. PATENT DOCUMENTS

| | | | |
|---|---|---|---|
| 6,137,793 A | 10/2000 | Gorman et al. | |
| 6,239,889 B1 | 5/2001 | Harley et al. | |
| 6,323,978 B1 | 11/2001 | Harley et al. | |
| 6,563,829 B1 | 5/2003 | Lyles et al. | |
| 6,574,016 B1 | 6/2003 | Harley et al. | |
| 6,580,498 B1 | 6/2003 | Harley | |
| 6,700,903 B1 | 3/2004 | Boyd et al. | |
| 6,801,547 B1 | 10/2004 | Boyd et al. | |
| 6,859,622 B1 | 2/2005 | Jiang et al. | |
| 6,917,614 B1 | 7/2005 | Laubach et al. | |
| 6,967,949 B2 | 11/2005 | Davis et al. | |
| 7,266,306 B1 | 9/2007 | Harley et al. | |
| 7,321,728 B2 | 1/2008 | Harley et al. | |
| 7,349,537 B2 | 3/2008 | Kramer et al. | |
| 7,525,982 B2 | 4/2009 | Kramer et al. | |
| 7,590,139 B2 | 9/2009 | Boyd et al. | |
| 7,599,400 B2 | 10/2009 | Roberts et al. | |
| 7,599,625 B1 | 10/2009 | Harley et al. | |
| 7,606,498 B1 | 10/2009 | Wu et al. | |
| 7,630,639 B2 | 12/2009 | Kramer et al. | |
| 7,664,019 B2 | 2/2010 | Boyd et al. | |
| 7,676,161 B2 | 3/2010 | Roberts et al. | |
| 7,894,721 B2 | 2/2011 | Roberts et al. | |
| 8,059,970 B2 | 11/2011 | Harley et al. | |
| 8,166,365 B2 | 4/2012 | Harley et al. | |
| 8,180,228 B1 | 5/2012 | Harley et al. | |
| 8,230,294 B2 | 7/2012 | Roberts et al. | |
| 8,335,316 B2 | 12/2012 | Hirth et al. | |
| 8,588,257 B2 | 11/2013 | Boyd et al. | |
| 8,737,834 B2 | 5/2014 | Boyd et al. | |
| 8,744,261 B2 | 6/2014 | Hirth et al. | |
| 8,798,470 B2 | 8/2014 | Boyd et al. | |
| 8,848,523 B2 | 9/2014 | Boyd et al. | |
| 8,879,904 B1 | 11/2014 | Harley et al. | |
| 8,903,250 B2 | 12/2014 | Boyd et al. | |
| 8,942,561 B2 | 1/2015 | Boyd et al. | |
| 8,964,538 B2 | 2/2015 | Kramer et al. | |
| 8,964,782 B2 | 2/2015 | Harley et al. | |
| 8,983,309 B2 | 3/2015 | Harley et al. | |
| 9,106,438 B2 | 8/2015 | Davis et al. | |
| 9,113,237 B2 | 8/2015 | Boyd et al. | |
| 9,130,878 B2 | 9/2015 | Boyd et al. | |
| 9,148,224 B2 | 9/2015 | Diab et al. | |
| 9,258,190 B2 | 2/2016 | Swinkels et al. | |
| 9,319,758 B2 | 4/2016 | Goswami et al. | |
| 9,337,929 B2 | 5/2016 | Boyd et al. | |
| 9,413,466 B2 | 8/2016 | Boyd et al. | |
| 9,432,753 B2 | 8/2016 | Hirth et al. | |
| 9,455,785 B2 | 9/2016 | Boyd et al. | |
| 9,479,621 B2 | 10/2016 | Kliger et al. | |
| 9,531,562 B2 | 12/2016 | Currivan et al. | |
| 9,553,744 B2 | 1/2017 | Prodan et al. | |
| 9,577,758 B2 | 2/2017 | Boyd | |
| 9,596,041 B2 | 3/2017 | Currivan et al. | |
| 9,681,209 B2 | 6/2017 | Boyd | |
| 9,774,394 B2 | 9/2017 | Harley et al. | |
| 9,859,984 B2 | 1/2018 | Harley et al. | |
| 10,236,981 B2 | 3/2019 | Harley et al. | |
| 10,382,134 B2 | 8/2019 | Boyd et al. | |
| 10,715,888 B2 | 7/2020 | Swinkels et al. | |
| 10,771,872 B2 | 9/2020 | Boyd | |
| 10,862,963 B2 | 12/2020 | Boyd et al. | |
| 10,863,256 B2 | 12/2020 | Boyd et al. | |
| 10,985,900 B1 | 4/2021 | Abdo et al. | |
| 11,038,549 B1 | 6/2021 | Harley et al. | |
| 11,277,206 B1 | 3/2022 | Oveis Gharan et al. | |
| 11,336,367 B1 | 5/2022 | Oveis Gharan et al. | |
| 2010/0027769 A1 | 2/2010 | Stevens et al. | |
| 2010/0098412 A1 | 4/2010 | Boyd et al. | |
| 2010/0166419 A1* | 7/2010 | Elmoalem | H04Q 11/0067 398/35 |
| 2011/0222854 A1 | 9/2011 | Roberts et al. | |
| 2011/0262132 A1 | 10/2011 | Grindley et al. | |
| 2013/0148956 A1* | 6/2013 | Khotimsky | H04B 10/032 398/2 |
| 2013/0202286 A1 | 8/2013 | Boyd et al. | |
| 2013/0202304 A1 | 8/2013 | Boyd et al. | |
| 2013/0315238 A1 | 11/2013 | Lamb et al. | |
| 2013/0315593 A1 | 11/2013 | Lamb et al. | |
| 2014/0072304 A1 | 3/2014 | Boyd et al. | |
| 2014/0133855 A1 | 5/2014 | Chaffins et al. | |
| 2014/0294388 A1* | 10/2014 | Odaka | H04J 3/1694 398/66 |
| 2015/0046775 A1 | 2/2015 | Prodan et al. | |
| 2015/0256284 A1 | 9/2015 | Laubach et al. | |
| 2016/0164632 A1 | 6/2016 | Oveis Gharan et al. | |
| 2020/0036468 A1 | 1/2020 | Roberts et al. | |
| 2022/0294538 A1 | 9/2022 | Harley et al. | |
| 2022/0294604 A1 | 9/2022 | Oveis Gharan et al. | |
| 2023/0198878 A1 | 6/2023 | Boyd et al. | |

OTHER PUBLICATIONS

Mar. 11, 2025, International Search Report and Written Opinion for International Patent Application No. PCT/US2024/056674.

Claudio Desanti et al., "Super-PON: an evolution for access networks," Journal Optical Communications and Networking, Research Article, vol. 12, No. 10, Oct. 2020, pp. 66-77.

ITU-T Telecommunication Standardization Sector of ITU, G.989.3, "40-Gigabit-capable passive optical networks (NG-PON2): Transmission convergence layer specification," Series G: Transmission Systems and Media, Digital Systems and Networks, Digital sections and digital line system—Optical line systems for local and access networks, May 2021, pp. 1-280.

ITU Publications, International Telecommunication Union, ITU-T G.9807.1, "10-Gigabit-capable symmetric passive optical network (XGS-PON)," Series G: Transmission systems and media, digital systems and networks, Access networks—Optical line systems for local and access networks, Feb. 2023, pp. 1-290.

ITU-T Telecommunication Standardization Sector of ITU, G.984.1, "Gigabit-capable passive optical networks (GPON): General characteristics," Series G: Transmission systems and media, digital systems and networks, Mar. 2008, pp. 1-43.

ITU-T Telecommunication Standardization Sector of ITU, Series G Supplement 51, "Passive optical network protection considerations," Series G: Transmission systems and media, digital systems and networks, May 2012, pp. 1-36.

* cited by examiner

| | | Primary OLT | Standby OLT | Notes |
|---|---|---|---|---|
| ODN Configuration | | | | |
| Distance to ONU$_{NEAR}$ | m | 0 | 80 | distance of single TypeF Row |
| Distance to ONU$_{FAR}$ | m | 80 | 0 | assume worst case for Standby vs. Primary |
| Delta from Primary perspective | m | 80 | | |
| Max range error by Standby | m | | 160 | From perspective of Standby using ranging from Primary: max range error in grants |
| Fixed Inputs | | | | |
| Speed of light | m/s | 299,792,458 | | |
| Refractive index of ITU-T PON fiber | | 1.47 | | |
| PON fiber speed | m/ns | 0.2039 | | |
| Time to travel 1 meter | ns | 4.90 | | |
| Guard time slot | ns | 12.8 | | separation between previous PHY burst end and new PHY burst start times in BWmap for ONU transmit times |
| Min guard time | slots | 16.0 | | configurable |
| Min guard time | ns | 204.8 | | |
| in bits | bits | 2,048.0 | | |
| Max guard time | slots | 1,000.0 | | configurable |
| Max guard time | ns | 12,800.0 | | |
| Tx Enable time | ns | 12.90 | | worst case (from GPON) |
| Tx Disable time | ns | 12.90 | | worst case (from GPON) |
| Network Configuration | | | | |
| Min guard time (conventional) | ns | 409.6 | | Standard guard time, includes allowance for Tx enable & disable |
| Guard time for 160 m | ns | 1,569.1 | | Additional guard time required without re-ranging; compensation for worst case |
| Min guard time for TypeB prot. netwo | ns | 1,978.7 | | |
| Min guard time setting required | slots | 155 | | minimum guard time (in slots) to meet distance requirement |
| Impact on traffic (for reference only; depends on network-specific traffic loadings & configuration) | | | | |
| PSBu | bits | 192.0 | | |
| XGTC header | bits | 32.0 | | |
| DBRu | bits | 32.0 | | |
| ONU grant in bits | bits | 77,744.0 | | = 9718 bytes |
| Grants/PSBu | # | 3 | | |
| | | 233,232.0 | | 29154 |
| Standard guard time | bits | 4,096.0 | | 410 ns expressed as bits @10Gb/s |
| PSBu frame size | bits | 237,328.0 | | max is 310400 bits |
| time to transmit standard PSBu | ns | 23,732.8 | | |
| tax from add'l guard time | ns | 1,569.1 | | |
| tax from add'l guard time | % | 6.6% | | |
| max U/S throughput | Gb/s | 8.12 | | |

*FIG. 8*

RANGELESS FAILOVER IN PON PROTECTION SWITCHING

FIELD OF THE DISCLOSURE

The present disclosure relates generally to networking and computing. More particularly, the present disclosure relates to systems and methods for a rangeless failover in Passive Optical Network (PON) protection switching, such as with Type B PON protection.

BACKGROUND OF THE DISCLOSURE

PON is a fiber-optic telecommunications technology for delivering broadband network access to end-customers. Its architecture implements a point-to-multipoint topology in which a single optical fiber serves multiple endpoints by using unpowered (passive) fiber optic splitters to divide the fiber bandwidth among the endpoints. There are generally two standards paths for PON-Gigabit Passive Optical Networking (GPON) and Ethernet Passive Optical Networking (EPON). GPON is defined in ITU-T, such as, e.g., (1) ITU-T G.9807.1:10-Gigabit-capable symmetric passive optical network (XGS-PON), 02/23, (2) ITU-T G.984.1: Gigabit-capable passive optical networks (GPON): General characteristics, 03/08, and (3) ITU-T G.989.3:40-Gigabit-capable passive optical networks (NG-PON2): Transmission convergence layer specification, 05/21, the contents of each are incorporated by reference in their entirety. EPON is defined in IEEE, such as IEEE 802.3cs-2002, EEE Standard for Ethernet Amendment 2: Physical Layers and Management Parameters for Increased-Reach Point-to-Multipoint Ethernet Optical Subscriber Access (Super-PON), the contents of which are incorporated by reference in their entirety. There are other standards in the GPON and EPON families, as well as new standards for 100G and beyond.

PON can generally be considered as a point-to-multipoint network, much like wireless networks such as Wi-Fi, 2G-4G, etc. Redundancy is generally not fundamental in these networks. However, there are services such as business services, mobile backhaul, high-density residential services, data center networks, and the like which may justify the addition of PON redundancy and protection switching. The ITU-T G.984.1 outlines several topologies for achieving redundancy; these have been named Type A, Type B, Type C and Type D, and further details are described in Supplement 51, Series G, Passive optical network protection considerations, 05/12, the contents of which are incorporated by reference in their entirety.

BRIEF SUMMARY OF THE DISCLOSURE

The present disclosure relates to systems and methods for a rangeless failover in PON protection switching, such as with Type B PON protection. Type B PON protection provides a protection pair with a primary Optical Line Terminal (OLT) and a standby or backup OLT where the standby can "take over" upon a detected failure in either the primary OLT or in the fiber optic cables that are unique to the primary OLTs non-redundant cable paths. Differences in the fiber optic cable length and service provider's Optical Distribution Network (ODN) architecture between the primary OLT as compared to the standby OLT can result in the potential of overlapping upstream transmissions from different Optical Network Units (ONUs) resulting in errored communications at the OLT upstream receiver. This may result in reset of the PON to re-range all ONUs. That is, in conventional Type B PON protection, a switchover from the primary OLT to the standby OLT may require re-ranging all ONUs which can cause traffic disruptions such that a switchover takes several hundred milliseconds to seconds where there is traffic loss.

The present disclosure provides a rangeless failover in PON Type B protection switching, meaning there is no need to stop traffic and re-range ONUs on the standby OLT, which is now active. Instead, ranging is performed in-service so that the protection switching is significantly faster, e.g., 250 ms or less. Ranging on the primary OLT determines the differential propagation delay time between closest and furthest ONU. The present disclosure utilizes a value based on the primary OLT to create a guard time on the standby OLT. The standby OLT uses a profile with the larger guard time. After switchover, the standby (now active) OLT will micro-range the ONUs into optimum time position, meaning adjust the guard times in-service as opposed to setting completely new times from scratch. After that, the standby OLT will return to another profile with shorter overhead.

In an embodiment, an Optical Line Terminal (OLT) includes a transmitter configured to connect to a plurality of Optical Network Units (ONUs) on a downstream channel; a receiver configured to connect to the plurality of ONUs on an upstream channel; and circuitry communicatively coupled to the transmitter and the receiver, wherein the circuitry is configured to, responsive to protection switch from a primary OLT, enable the transmitter on the downstream channel, and utilize a Dynamic Bandwidth Assignment (DBA) function on the downstream channel with a guard time that includes a normal guard time plus a differential time added thereto. The guard time is larger than a guard time used by the primary OLT prior to the protection switch. The differential time can be based on a differential between a closest ONU and a farthest ONU, relative to the primary OLT, prior to the protection switch. The OLT and the primary OLT can have different distances to the plurality of ONUs on the downstream channel, and wherein the differential time ensures there is no overlapping transmission by any ONU of the plurality of ONUs after the protection switch. The differential time can be a configured value based on a topology of an Optical Distribution Network (ODN).

The circuitry can be further configured to, while the DBA function is utilized with the guard time including the differential time, adjust the differential time based on detection of actual ranges to the plurality of ONUs, in-service. The circuitry can be further configured to, after the protection switch, perform ranging with larger overhead on the upstream channel to adjust any of the guard time and the differential time, and reduce the larger overhead after the ranging. The circuitry can be further configured to, prior to the protection switch, receive state information from the primary OLT including registered ONUs of the plurality of ONUs. The circuitry can be further configured to, prior to the protection switch, receive state information from the primary OLT including ranging information between the primary OLT and the plurality of ONUs, wherein the ranging information is used for the differential time. The OLT and the primary OLT can be configured according to Type B PON protection.

In another embodiment, a method includes, responsive to protection switch from a primary Optical Line Terminal (OLT), enabling a transmitter of a standby OLT on a downstream channel to a plurality of Optical Network Units (ONUs); and utilizing a Dynamic Bandwidth Assignment (DBA) function on the downstream channel, by the standby OLT which has become active, with a guard time that includes a normal guard time plus a differential time added thereto. The guard time is larger than a guard time used by the primary OLT prior to the protection switch. The differential time can be based on a differential between a closest ONU and a farthest ONU, relative to the primary OLT, prior to the protection switch. The standby OLT and the primary OLT can have different distances to the plurality of ONUs on the downstream channel, and wherein the differential time ensures there is no overlapping transmission by any ONU of the plurality of ONUs after the protection switch. The differential time can be a configured value based on a topology of an Optical Distribution Network (ODN).

The method can further include, while the DBA function is utilized with the guard time including the differential time, adjusting the differential time based on detection of actual ranges to the plurality of ONUs from the standby OLT which is now active, in-service. The method can further include, after the protection switch, performing ranging with larger overhead on the upstream channel to adjust any of the guard time and the differential time; and reducing the larger overhead after the ranging. The method can further include, prior to the protection switch, receiving state information at the standby OLT from the primary OLT including registered ONUs of the plurality of ONUs. The method can further include, prior to the protection switch, receiving state information at the standby OLT from the primary OLT including ranging information between the primary OLT and the plurality of ONUs, wherein the ranging information is used for the differential time. The standby OLT and the primary OLT can be configured according to Type B PON protection.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a table of an example calculation to determine the additional differential time, based on factors associated with the ODN.

DETAILED DESCRIPTION OF THE DISCLOSURE

Again, the present disclosure relates to systems and methods for a rangeless failover in PON protection switching, such as with Type B PON protection. As described herein, "rangeless failover" means a standby OLT does not need to re-range (re-register) ONUs on switchover, but rather start with a larger guard time based on the primary OLT and then micro-range the ONUs into optimum time positions. Those skilled in the art understand "optimum time positions" do not necessarily mean the absolute best, but rather improved from those with the larger guard time. The present disclosure utilizes a non-optimum guard time on switchover so that the micro-ranging can be performed in-service, i.e., no overlapping due to the different ranges on the standby OLT versus the primary OLT. While the larger guard time causes slightly less efficient bandwidth on the standby OLT right after the switchover, advantageously, it provides an ability to switchover in-service without re-ranging which could take seconds where traffic is disrupted. This larger guard time is adjusted in-service as opposed to starting over and causing traffic disruptions.

PON Network

Figure 1:
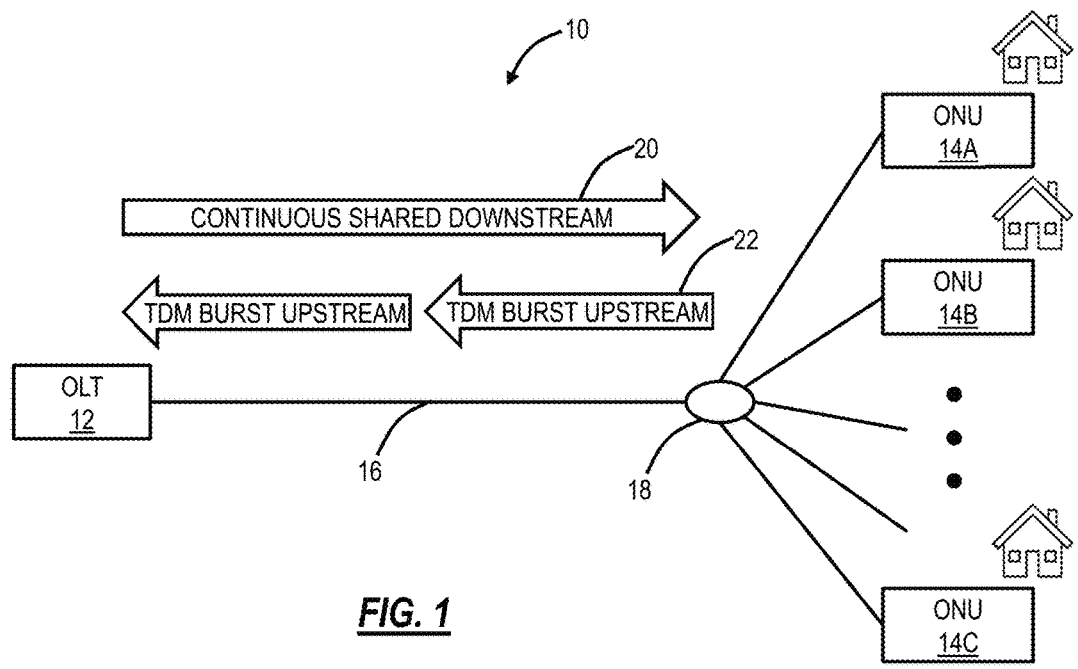
FIG. 1 is a network diagram of an example PON network.

FIG. 1 is a network diagram of an example PON network 10. Time Division Multiple Access (TDMA) PON is deployed using a point-to-multipoint (PtMP) Optical Distribution Network (ODN), and, for illustration purposes, FIG. 1 is a single OLT 12 connected to a plurality of ONUs 14A-12C, via a fiber optical cable 16 that connects to a passive optical splitter 18 thereby connecting the OLT 12 to the multiple ONUs 14A, 14B, 14C. Split ratios are typically deployed with up to 64 (1:64 split) or up to 128 (1:128 split) ONUs 14 per OLT 12. Also, the maximum distance can be up to 20 km on longer (e.g., 30 km) between the OLT 12 and the furthest ONU 14. The PON network 10 generally operates with a maximum differential distance between the closest ONU 14 and furthest ONU 14 of 20 km.

Figure 2:
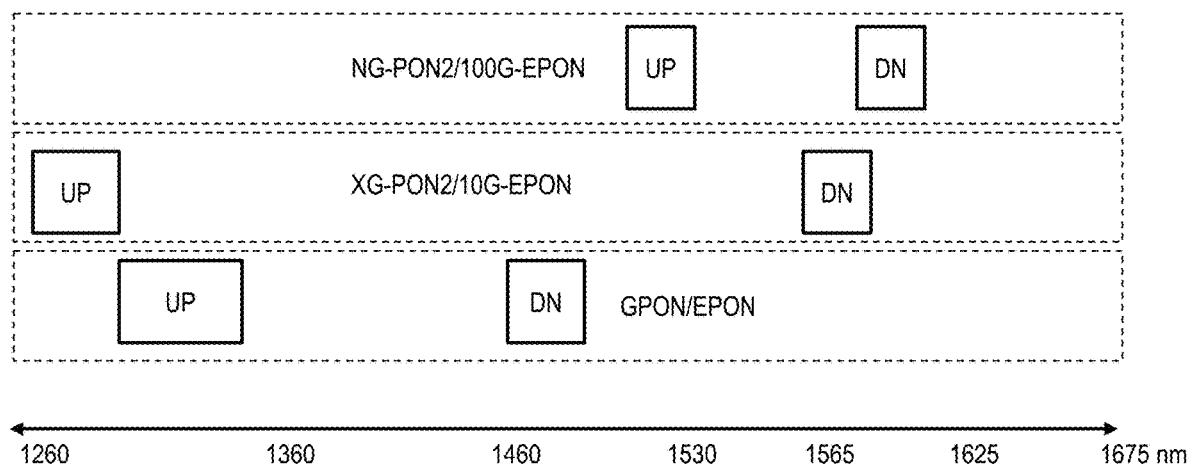
FIG. 2 a is a spectrum diagram illustrating optical spectrum (wavelengths) used for the downstream channel (DN) and an upstream channel (UP) in some example standards.

In the downstream direction (from the OLT 12 to the ONUs 14A, 14B, 14C), i.e., a downstream channel 20, there is a one transmitter at the OLT 12 and each ONU 14A, 14B, 14C has a receiver. The OLT 12 continuously transmits on the downstream channel 20, which is typically at a fixed wavelength that is detailed in the corresponding standard; e.g., ITU-T G.9807.1 is one example. FIG. 2 a is a spectrum diagram illustrating optical spectrum (wavelengths) used for the downstream channel 20 (DN) and an upstream channel 22 (UP) in some example standards. ONUs 14A, 14B, 14C are continuously receiving and demodulating a signal on the downstream channel 20. Unique allocation identifiers are assigned by the OLT 12 during the discovery and registration process such that each ONUs 14A, 14B, 14C can be specifically addressed. That is, each ONU 14A, 14B, 14C receives the same optical signal on the downstream channel 20, based on the passive optical splitter 18 splitting copies to each. The ONUs 14A, 14B, 14C are configured to differentiate their data based on the unique allocation identifiers.

In the upstream direction (from each of the ONUs 14A, 14B, 14C to the OLT 12), i.e., the upstream channel 22, there is one receiver at the OLT and each ONU has a transmitter. The upstream channel 22 is also at a fixed wavelength that is detailed in the corresponding standard; e.g., ITU-T G.9807.1 is one example, with the downstream channel 20 and the upstream channel 22 being at different wavelengths. Transmissions overlapping in time from two or more ONUs 14A. 14B, 14C on the upstream channel 22 create a collision of modulated signals preventing reception and demodulation at the OLT 12. To prevent this, a TDMA mechanism is defined by a PON standard that permits the OLT 12 to grant time-based access to the upstream channel 22 to a specific ONU 14A, 14B, 14C where the grant indicates when in time to start transmitting and for how long (e.g., in time or in bytes).

Based on algorithms used by the OLT's 12 Dynamic Bandwidth Assignment (DBA) function, many ONUs 14A, 14B, 14C can be multiplexed on the upstream channel 22 with no overlapping transmissions. For the TDMA to properly work, ONUs 14A, 14B, 14C must first be discovered and ranged (also known as equalized) to match the OLTs 12 timing for the upstream channel 22. At first ONUs 14A, 14B, 14C are connected to the ODN at an unknown distance from the OLT 12 creating an inherent round-trip-time (RTT) error in timing based the optical signal propagation delay of the fiber. A 20 km maximum differential distance with a 5 μsec one-way delay per kilometer, represents a total RTT of 200 μsec of potential timing error.

To permit discovery and ranging of a "new" ONU 14A, 14B, 14C, the OLT DBA must periodically allocate a large amount of "dead" time where no in-service ONUs ONU 14A, 14B, 14C except new ONUs ONU 14A, 14B, 14C are permitted to transmit. This is termed a quiet window or a discovery window in PON standards. The length in time of the quiet window includes the RTT along with ONU and OLT processing times. For a 20 km differential distance, this can be 200+50=250 μsec. The scheduling of a quiet window can be a fixed interval, for example every 3 seconds, or can be dynamically varied based on other requirements. More than one new ONU 14A, 14B, 14C can try to register during a quiet window and the PON standard includes mechanisms for detecting overlapping signal transmissions and sorting out using a specified contention resolution mechanism. This quiet window is fundamental for PON systems for bringing unregistered and unknown ONUs 14A, 14B, 14C online; they become registered and known. The OLT 12 can adjust the ranging on an ONU at any time without using a quiet window to account for any clock drift or thermal changes in the system that might impact timing. The basis for this adjustment comes from the observation by the OLT 12 on the differences of the grant start time issued to a registered ONU 14A, 14B, 14C and the actual arrival time of the burst at the OLT's 12 receiver.

For example. consider a PON system with a single OLT 12 and 64 ONUs 14 where all ONUs 14 are powered up and operating. If the OLT 12 is rebooted, reset, power cycled, etc. knowledge of the registered ONUs 14 is lost and each ONU 14 will have to be rediscovered. Even with the contention resolution mechanism used during the quiet windows, it can take to seconds to multiple tens of seconds to rediscover all previously operating ONUs 14. This is also the case if the main feeder fiber optic cable between the OLT 12 is switched such as in Type B protection.

Example of Range in a PON System

Figure 3:
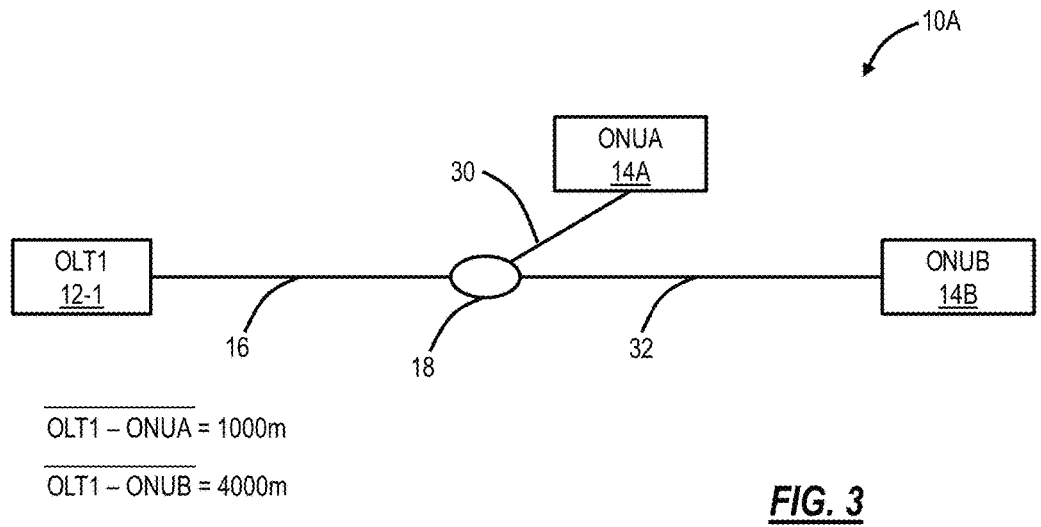
FIG. 3 is a network diagram of an example PON network with an OLT1 and two ONUs (ONUA, ONUB) for illustrating ranging.

FIG. 3 is a network diagram of an example PON network 10A with an OLT1 12-1 and two ONUs (ONUA, ONUB) 14A, 14B for illustrating ranging. For simplicity of illustration, only two ONUs 14A, 14B are shown; of course, a typical PON network 10A may include up to 64 or 128 ONUs. The OLT1 12-1 connects to the ONUs 14A, 14B via an Optical Distribution Network (ODN). The present disclosure describes some examples of the ODN, but those skilled in the art will recognize the present disclosure contemplates operation with any ODN where there are different ranges between ONUs 14A, 14B.

In the example of FIG. 3, the ODN includes a main feeder fiber optic cable 16 that connects the OLT1 12-1 to a splitter 18. If the main fiber optic cable 16 is either disconnected at either side (OLT1 12-1 or splitter 18) or if there is a fiber cut, i.e., break somewhere on the fiber optic cable 16, then the OLT1 12-1 loses communication with all ONUs 14A, 14B. Service to any and all ONUs 14A, 14B continues to be interrupted until the main fiber optic cable is restored to operation, i.e., reconnected, repaired, etc. In this example figure, both the ONUs 14A, 14B are at different distances from the OLT1 12-1. That is, the distance on the main feeder fiber optic cable 16 is the same for all of the ONUs 14A, 14B. The splitter 18 can be a passive device that provides point (OLT1 12-1) to multi-point (ONUs 14A, 14B) connectivity. That is, the splitter 18 operates to split transmission from the OLT1 12-1 to all of the OLT1 12-1 to all of the ONUs 14A, 14B on the downstream channel 20, and to combine fibers from all of the ONUs 14A, 14B to the OLT1 12-1 on the upstream channel 22. Again, all of the ONUs 14A, 14B can simultaneously receive the downstream channel 20. The OLT1 12-1 only receives from one of the ONUs 14A, 14B at a time on the upstream channel 22. The problem of range occurs on the upstream channel 22 where differences in distance can cause overlapping transmissions by the ONUs 14A, 14B.

Fiber cables 30, 32 after the splitter 18 can have difference distances. In this example, there is 1000 m of fiber optic cable 16, 30 in the ODN between the ONUA 14A and the OLT1 12-1, and 4000 m between the ONUB 14B and the OLT1 12-1. Again, the ODN's illustrated here are example. A typical PON ODN includes the fiber optic cables 16, 30, 32 and sufficient number of cascaded splitters 18 to provide a separate fiber optic connection for each ONU 14 in the PON network 10. That is, there can be multiple splitters 18 with various topologies. Key to designing the ODN is engineering based on the loss and other optical parameters associated with transmitters and receivers in the OLT 12 and ONUs 14. All such topologies are contemplated herewith.

The key aspect here is there is a difference between the OLT1 12-1 and the ODUs 14A. 14B in terms of distance that must be addressed on the upstream channel 22. These distance discrepancies are dealt with in the DBA function with a single OLT1 12-1. There is a difference when there are multiple OLTs for redundancy.

Type B PON Protection

There is a technique for providing redundancy for the main fiber optic cable 16 as describe above which is referred to in the industry as Type B Protection. The basic design adds a second OLT 12 connected to the same ODNs 14 via redundant main fiber optic cables 16. The use of one or more 2: N splitters connects both OLTs 12 to the same ODN 14 permitting either OLT 12 to communicate with all ONUs 14 on the PON network 10.

In Type B protection, protection is provided over the major areas of concern, which include main fiber optic cable 16 and the OLT 12 equipment with separate OLT blades (or separate chassis in the case of a dual parented) for working and protection OLTs 12. No equipment redundancy is provided in the ONUs 14 or feeder fiber cables 30, 32. Thus, it does not provide ONU or full ODN protection, but it addresses where the majority of faults occur. For example, losing a single ONU 14 only affects one subscriber whereas a fault in the fiber 16 or the OLT 12 equipment affects all subscribers.

Type A protection utilizes an optical switch to protect the main fiber optic cable 16 with a single set of OLT 12 equipment. Type C and D protection adds redundancy for the ODU 14 equipment as well as the feeder fiber cables 30, 32. The present disclosure is described with reference to Type B protection, but those skilled in the art will recognize the rangeless failover described herein can apply to any situation where there is multiple OLT 12 equipment such that the ONUs 14A, 14B have different distances (ranges) between the multiple OLT 12 equipment.

Figure 4:
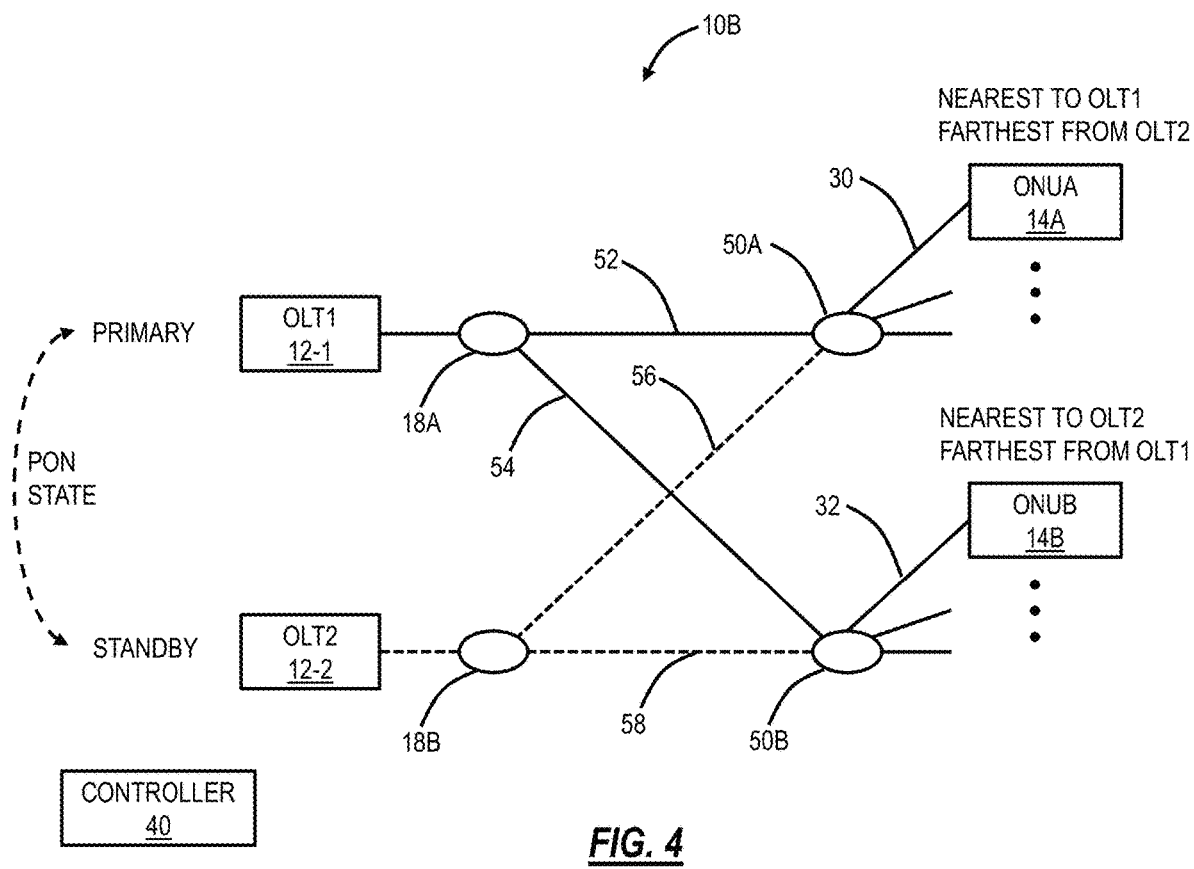
FIG. 4 is a network diagram of an example PON network with redundant OLTs and two ONUs for illustrating fiber optic cable redundancy.

FIG. 4 is a network diagram of an example PON network 10B with redundant OLTs (OLT1 12-1, OLT2 12-2) and two ONUs (ONUA, ONUB) 14A, 14B for illustrating fiber optic cable redundancy. The OLTs 12-1, 12-2 are located in a Central Office (CO), data center, or some other telecom office. In this example, the OLTs 12-1, 12-2 are shown located in different chassis (i.e., different network elements) which can be in the same office or separate office. That is, the OLTs 12-1, 12-2 can each be a module, transceiver, pluggable transceiver, etc. housed in a network element, such as a switch, router, etc. On one side, the network element includes the OLTs 12-1, 12-2 facing the ONUs 14 and, on the other side (not shown), there is data connectivity to a network (e.g., a service provider's network). The objective here is to protect the connectivity from the ONUs 14 to the network, in the intermediate stage from the network elements through the fiber cable 16.

In this example, there are two stages of splitters, namely a first stage of splitters 18A, 18B at or near the OLTs 12-1, 12-2, and a second stage of splitters 50A, 50B located at an end of main fiber optic cables 16A, 16B. The splitters 18A, 18B can be 1×2 splitters which split the OLTs 12-1, 12-2 onto two different fiber cables 52, 54, 56, 58, which provides redundant fiber to the splitters 50A, 50B which then fan out via the feeder fiber cables 30, 32 to the ONUs 14A, 14B. The splitters 18A, 18B allow each of the OLTs 12-1, 12-2 to operate over redundant fibers, for fiber cut protection. In an embodiment, the fiber cables 52, 56 can be in a first conduit as can the fiber cables 54, 58 which can be in a second conduit. The first conduit and the second conduit can have geographic diversity for protection. Of course, they could be co-routed, they could same some common routing, etc.

The splitters 50A, 50B can be 2×N splitters where N can be the maximum number of connected ONUs 14. This configuration provides fiber optic cable redundancy for all fiber optic cables 52, 54, 56, 58 between either of the OLTs 12-1, 12-2 and the splitters 50A, 50B, along with equipment protection at the OLTs 12-1, 12-2. Of course, there can be various different fiber cable configurations from the OLTs 12-1, 12-2 ultimately to the ONUs 14A, 14B, all of which are contemplated, including various stages and arrangements of splitters 18A, 18B, 50A, 50B, including omitting the splitters 18A, 18B, adding additional stages of splitters, and the like. The key here is there are two possible OLTs 12-1, 12-2, one being active or primary and one being standby or backup, and the fact that distance may vary between the OLTs 12-1, 12-2 and the ONUs 14A, 14B.

Note that the selection of the OLTs 12-1, 12-2 as primary or standby is purely arbitrary in these illustrations. Also, how these OLTs 12-1, 12-2 manage who is primary or standby is known in the art. For example, the standby OLT2 12-2 can monitor the upstream channel 22 and determine the primary OLT1 12-1 is down or has a fiber cut, and take over the role as primary. In addition, the controller 40 can be configured to manage the configurations of the OLTs 12-1, 12-2, such that the backup OLT2 12-2 can have the provisioning similar to the primary OLT 12-1, e.g., discovered ONUs 14A, 14B, etc.

The OLTs 12-1, 12-2 are likely located at different physical locations, requiring differing lengths of fiber optic cable. By different physical locations, we could mean the same office, but a different location therein, as well as even the same chassis, but with different fiber routing inside the office. Of course, preferably, the OLTs 12-1, 12-2 would be in different chassis to ensure redundancy. The key is there is a difference in fiber lengths between the OLTs 12-1, 12-2 and the associated ONUs 14A, 14B. In this example, we assume the ONU 14A is nearest to the OLT1 12-1 and farthest from the OLT2 12-2, and the ONU 14B is nearest to the OLT2 12-2 and farthest from the OLT1 12-1. Of course, actual implementations will vary.

It is assumed that both the OLTs 12-1, 12-2 are powered on and operational. The system operator can select which OLT 12-1, 12-2 will be primary and which will be standby. The standby OLT2 12-2 initially turns its transmitter off so as to not interfere with downstream communication signals from the primary OLT1 12-1. Note, in FIG. 4, the interference is on the feeder fiber cables 30, 32. Such configuration can be via the controller 40. The controller 40 can be a PON controller, a network management system, cloud-based control, or even some logic and user interface on a switch housing either of the OLTs 12-1, 12-2. While such configurations can be shared between the OLTs 12-1, 12-2 via the controller 40, ranging is different as the OLT1 12-1 would have no idea of the ranging for the OLT2 12-2 and vice versa.

Protection Switching Speed

The main figure of merit in a Type B protection system and the focus of this disclosure is how fast can the PON network 10B recovers when switching from the primary OLT1 12-1 to the standby OLT2 12-2 such that all ONUs 14A, 14B are returned to operational communications as fast as possible.

Type B Protection Primary OLT Responsibilities

As with a single OLT system such as the PON network 10A, the primary OLT1 12-1 creates upstream quiet window opportunities on the upstream channel 22 to register and range new ONUs 14, as well as provision ONUs 14 with an appropriate service configuration. The DBA function in the OLT 12 manages the system resources and issues grants to the ONUs 14 based on received data queue reports or other mechanisms. The DBA function is responsible for granting access to the upstream channel 22 such that transmission from two or more ONUs 14A, 14B do not overlap, causing corrupted signals. To account for nominal ramp up and ramp down time such as for turning each ONU's 14A, 14B laser on and then off respectively, a guard time is used to provide the necessary separation in time between bursts from different ONUs 14A, 14B. A typical guard time can be configured and is typically on the order of 410 nanoseconds (ns).

Figure 5:
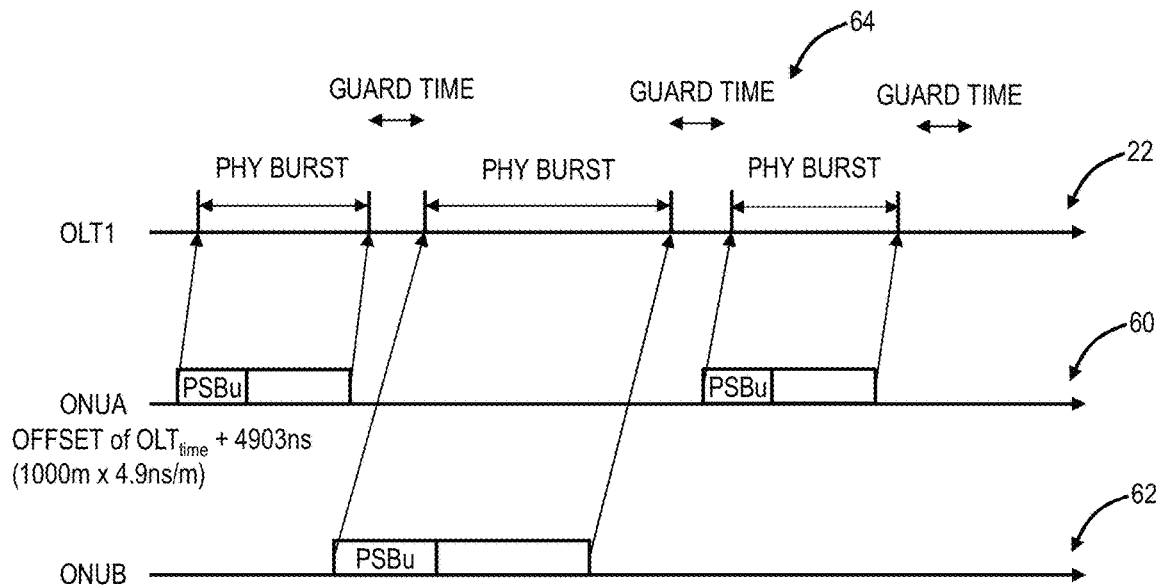
FIG. 5 is a diagram of transmissions from the ONUs on the upstream channel to the OLT1 for illustrating non-overlapping transmissions.

FIG. 5 is a diagram of transmissions from the ONUs 14A, 14B on the upstream channel 22 to the OLT1 12-1 for illustrating non-overlapping transmissions. Specifically, FIG. 5 includes line diagrams of the upstream channel 22 (connected to the OLT1 12-1), transmissions 60 by the ONU 14A, and transmissions 62 by the ONU 14B. That is, the line represents time, illustrating who is transmitting on the upstream channel 22 at a given time. There are various physical (PHY) bursts for each ONU 14A, 14B on the upstream channel 22, separated by guard time 64. Typically, the guard time 64 can be hundreds of nanoseconds, e.g., 410 ns, to allow for transmitter disable, transmitter enable, and start time jitter. The guard time 64 can be configurable based on the topology of the ODN as well as set at fixed values. Also, of note, there is an offset between when the ONU 14A starts transmitting and when the PHY burst is finally received at the OLT1 12-1 because of the finite speed of light. For example, the ONU 14A is 1000 m from the OLT1 12-1 and light travels about 4.9 ns/m, there is an offset of 4903 ns, which is visually indicated by the PHY burst on the upstream channel 22 being slightly shifted right from the transmission 60 by the ONU 14A.

The primary OLT1 12-1 shares PON and ONU state information with the standby OLT2 12-2 via messaging, the controller 40, an Ethernet channel, etc. The specific protocols, mechanisms, and procedures for this sharing is known in the art. Rather, the content of the shared data permits the standby OLT2 12-2 to become active, in the case of a protection triggering event, with sufficient information to quickly restore PON service to all previously operating and registered ONUs 14A, 14B. One item of state information particular to this disclosure is that as part of the ranging process, the primary OLT1 12-1 determines the timing differential between the closest ONU 14A and furthest ONU 14B.

Type B Protection Standby OLT Responsibilities

The standby OLT2 12-2, in addition to receiving state information from the primary OLT1 12-1, is continuously monitoring upstream received traffic on the upstream channel 22. Since the standby OLT's transmitter is disabled, i.e., since it is standby, the reception of any upstream traffic on the upstream channel 22 indicates the primary OLT1 12-1 is issuing grants. This directly indicates the primary OLT1 12-1 is operational and the main fiber optic cable 62, 64 path is intact. The primary OLT1 12-1 DBA is continuously polling the registered population of ONUs 14A, 14B which results in the standby OLT2's 12-2 ability to monitor consistent activity. The standby OLT2 12-2 detecting a loss of upstream burst reception beyond a configurable timeout threshold can signal a protection trigger event. That is, the protection switching can be based on monitoring the upstream channel 22 instead of some coordination via the controller 40. When triggered, the standby OLT2 12-2 assumes the primary OLT1 12-1 or the associated fiber optic cable has become non-operational, the standby OLT2 12-2 turns on its transmitter, and its DBA takes over.

A main issue with Type B protection is that the ONU 14A, 14B distances observed by the standby OLT2 12-2 will not be the same as the observed by the primary OLT1 12-1. Depending on the service provider's fiber optic ODN architecture, the propagation delay differences will have both fixed and inter-ONU differences. Stated differently, the standby OLT2 12-2 using the same ranging offset times as seen by the primary OLT2 12-2, may incur overlapping upstream transmission from different ONUs 14A, 14B impacting proper reception at the OLT receiver. If the standby OLT detects collisions, it will need to reset the PON and re-range all ONUs on the PON. Again, this could cause traffic disruptions of seconds to tens of seconds.

Figure 6:
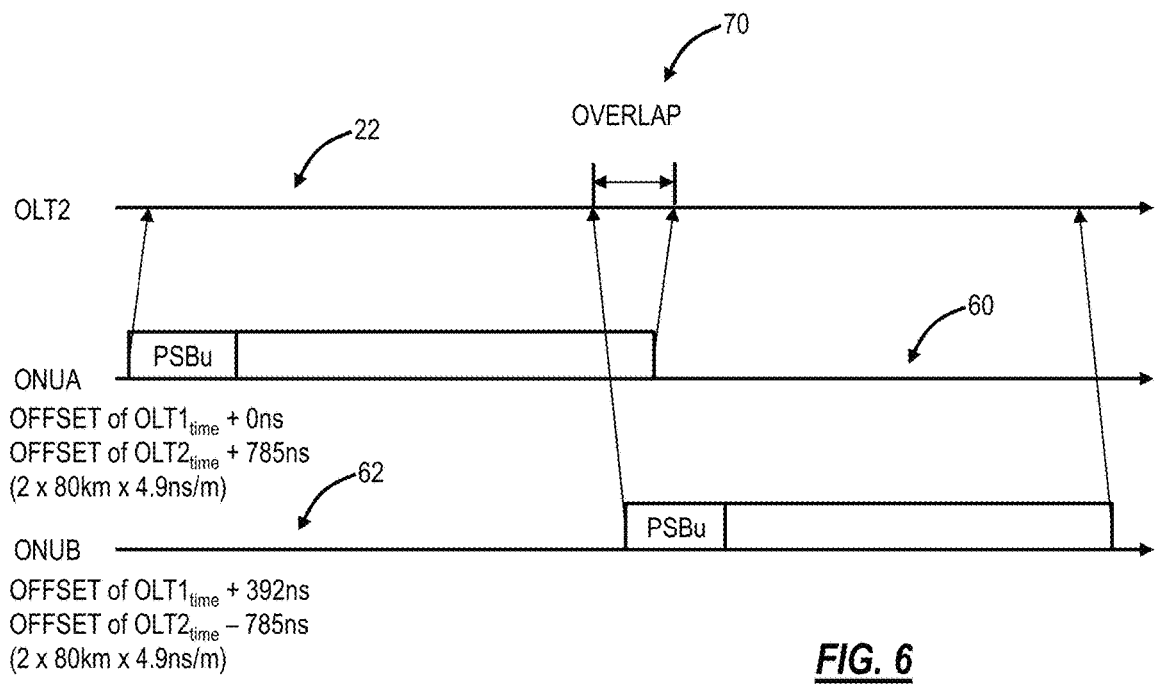
FIG. 6 is a diagram of transmissions from the ONUs on the upstream channel to the standby OLT2, after a protection switch from the OLT1 where the standby OLT2 becomes active, for illustrating overlapping transmissions, due to ranging differences.

FIG. 6 is a diagram of transmissions from the ONUs 14A, 14B on the upstream channel 22 to the OLT2 12-2, after a protection switch from the OLT1 12-1, for illustrating overlapping transmissions, due to ranging differences. In this example, from FIG. 4, where the ONU 14A is the nearest to the OLT1 12-1 and the farthest from the OLT2 12-2, the ranging is set by the OLT1 12-1, and then there is a protection switch such that the OLT2 12-2 becomes active with the same ranging as set by the OLT1 12-1. Again, in this example, the ONU 14B is the farthest from the OLT2 12-2 and the nearest to the OLT1 12-1, resulting in an overlap 70 where the ONUs 14A, 14B both transmit at the same time because of the ranging differences. Once this happens, the PON network 10B has to re-register all of the ONUs 14, leading to multiple seconds of traffic disruption which clearly defeats the purpose of protection.

OLT and Process for Rangeless Failover

In an embodiment, an OLT includes a transmitter configured to connect to a plurality of Optical Network Units (ONUs) on a downstream channel; a receiver configured to connect to the plurality of ONUs on an upstream channel; and circuitry communicatively coupled to the transmitter and the receiver, wherein the circuitry is configured to, responsive to protection switch from a primary OLT, enable the transmitter on the downstream channel, and utilize a Dynamic Bandwidth Assignment (DBA) function on the downstream channel with a guard time that includes a normal guard time plus a differential time added thereto. The guard time is larger than a guard time used by the primary OLT prior to the protection switch. The differential time cam be based on a differential between a closest ONU and a farthest ONU, relative to the primary OLT, prior to the protection switch.

The OLT and the primary OLT have different distances to the plurality of ONUs on the downstream channel, and wherein the differential time ensures there is no overlapping transmission by any ONU of the plurality of ONUs after the protection switch. The differential time can be a configured value based on a topology of an Optical Distribution Network (ODN).

The circuitry can be further configured to, while the DBA function is utilized with the guard time including the differential time, adjust the differential time based on detection of actual ranges to the plurality of ONUs, in-service. The circuitry can be further configured to, after the protection switch, perform ranging with larger overhead on the upstream channel to adjust any of the guard time and the differential time, and reduce the larger overhead after the ranging. That is, the OLT operates at lower efficiency (bandwidth) after the protection switch due to larger guard times and/or larger overhead to support in-service ranging.

The circuitry can be further configured to, prior to the protection switch, monitor the upstream channel and detect a fault requiring the protection switch based thereon. The circuitry can be further configured to, prior to the protection switch, receive state information from the primary OLT including registered ONUs of the plurality of ONUs. The circuitry can be further configured to, prior to the protection switch, receive state information from the primary OLT including ranging information between the primary OLT and the plurality of ONUs, wherein the ranging information is used for the differential time. The OLT and the primary OLT can be configured according to Type B PON protection.

Figure 7:
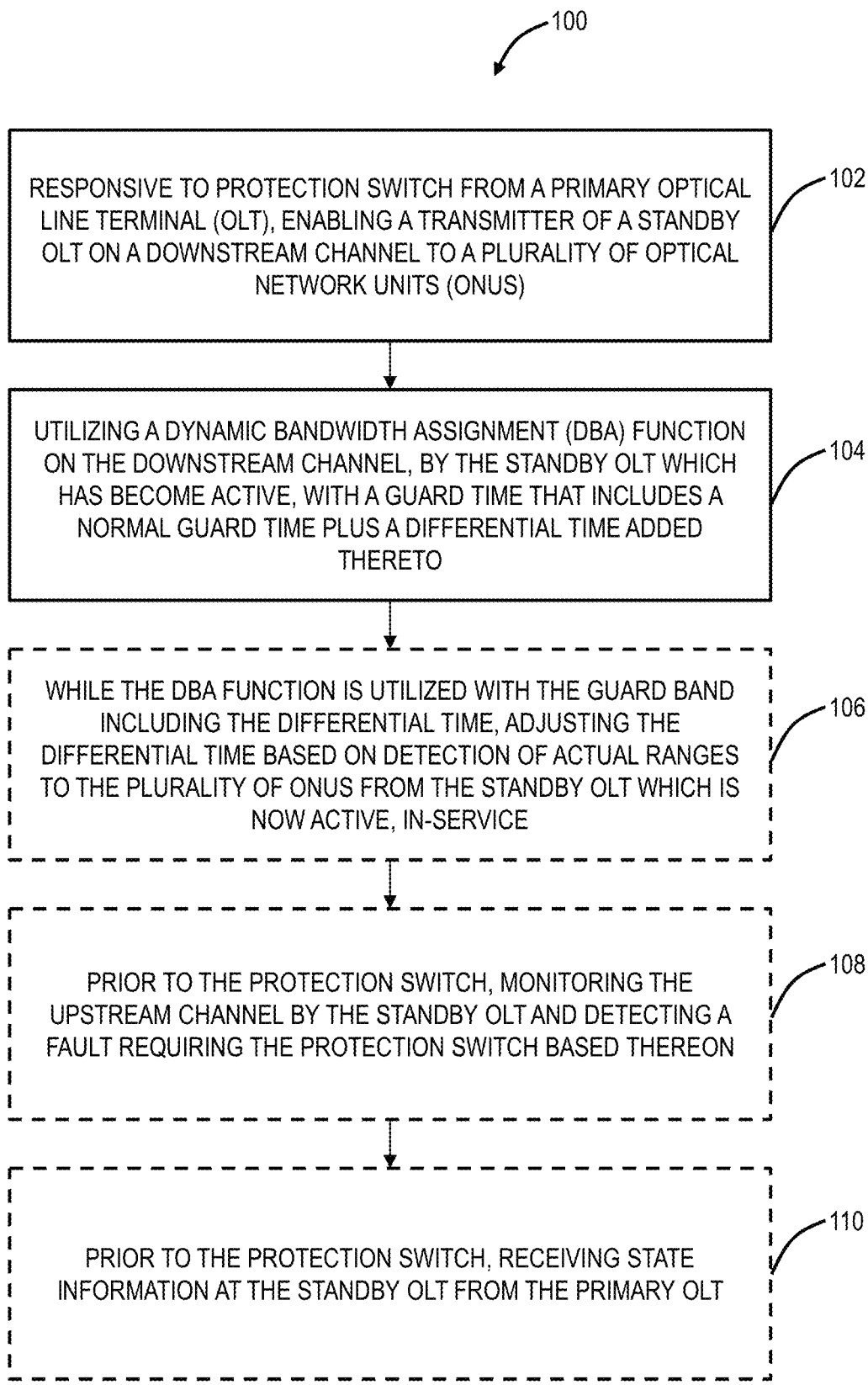
FIG. 7 is a flowchart of a process for rangeless failover implemented by an OLT, namely a standby OLT that becomes active.

FIG. 7 is a flowchart of a process 100 for rangeless failover implemented by an OLT, namely a standby OLT that becomes active. The process 100 includes. responsive to protection switch from a primary Optical Line Terminal (OLT), enabling a transmitter of a standby OLT on a downstream channel to a plurality of Optical Network Units (ONUs) (step 102); and utilizing a Dynamic Bandwidth Assignment (DBA) function on the downstream channel, by the standby OLT which has become active, with a guard time that includes a normal guard time plus a differential time added thereto (step 104).

The guard time is larger than a guard time used by the primary OLT prior to the protection switch. The differential time can be based on a differential between a closest ONU and a farthest ONU, relative to the primary OLT, prior to the protection switch. The standby OLT and the primary OLT have different distances to the plurality of ONUs on the downstream channel, and wherein the differential time ensures there is no overlapping transmission by any ONU of the plurality of ONUs after the protection switch. The differential time can be a configured value based on a topology of an Optical Distribution Network (ODN).

The process 100 can include, while the DBA function is utilized with the guard time including the differential time, adjusting the differential time based on detection of actual ranges to the plurality of ONUs from the standby OLT which is now active, in-service (step 106). The process 100 can include, prior to the protection switch, monitoring the upstream channel by the standby OLT and detecting a fault requiring the protection switch based thereon (step 108). The process 100 can include, prior to the protection switch, receiving state information at the standby OLT from the primary OLT (step 110). The state information can include registered ONUs of the plurality of ONUs, ranging information that is used for the differential time, and the like. The standby OLT and the primary OLT can be configured according to Type B PON protection.

The standby OLT DBA initially uses a new larger guard time which includes the normal guard time plus this differential time. This prevents the overlap problem. After switchover the standby (now active) OLT will "micro-range" the ONUs into optimum time position. After that, the standby OLT will return to the profile with the shorter overhead.

FIG. 8 is a table of an example calculation to determine the additional differential time 120, based on factors associated with the ODN. This is one example and those skilled in the art will appreciate other approaches are contemplated. Of note, the key is the differential time should be enough to ensure no overlapping transmission after the switch. Of course, the additional differential time added to the guard time lowers efficiency of the upstream channel 22, but at the expense of much faster restoration time (e.g., 250 ms or less vs. seconds or more). This is a simple trade-off and once the standby OLT operates, it can micro-range, i.e., adjust the guard time based on the actual ranging on the standby OLT, observed based on operation.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An Optical Line Terminal (OLT) comprising:
   a transmitter configured to connect to a plurality of Optical Network Units (ONUs) on a downstream channel;
   a receiver configured to connect to the plurality of ONUs on an upstream channel; and
   circuitry communicatively coupled to the transmitter and the receiver, wherein the circuitry is configured to
      responsive to protection switch from a primary OLT, enable the transmitter on the downstream channel, and
      utilize a Dynamic Bandwidth Assignment (DBA) function on the downstream channel with a guard time that includes a normal guard time plus a differential time added thereto,
   wherein the differential time is one of (i) based on a differential between a closest ONU and a farthest ONU, relative to the primary OLT, prior to the protection switch, or (ii) a configured value based on a topology of an Optical Distribution Network (ODN).

2. The OLT of claim 1, wherein the guard time is larger than a guard time used by the primary OLT prior to the protection switch.

3. The OLT of claim 1, wherein the OLT and the primary OLT have different distances to the plurality of ONUs on the downstream channel, and wherein the differential time ensures there is no overlapping transmission by any ONU of the plurality of ONUs after the protection switch.

4. The OLT of claim 1, wherein the circuitry is further configured to
while the DBA function is utilized with the guard time including the differential time, adjust the differential time based on detection of actual ranges to the plurality of ONUs, in-service.

5. The OLT of claim 1, wherein the circuitry is further configured to
after the protection switch, perform ranging with larger overhead on the upstream channel to adjust any of the guard time and the differential time, and
reduce the larger overhead after the ranging.

6. The OLT of claim 1, wherein the circuitry is further configured to
prior to the protection switch, receive state information from the primary OLT including registered ONUs of the plurality of ONUs.

7. The OLT of claim 1, wherein the circuitry is further configured to
prior to the protection switch, receive state information from the primary OLT including ranging information between the primary OLT and the plurality of ONUs, wherein the ranging information is used for the differential time.

8. The OLT of claim 1, wherein the OLT and the primary OLT are configured according to Type B PON protection.

9. An Optical Line Terminal (OLT) comprising:
a transmitter configured to connect to a plurality of Optical Network Units (ONUs) on a downstream channel;
a receiver configured to connect to the plurality of ONUs on an upstream channel; and
circuitry communicatively coupled to the transmitter and the receiver, wherein the circuitry is configured to
responsive to protection switch from a primary OLT, enable the transmitter on the downstream channel,
utilize a Dynamic Bandwidth Assignment (DBA) function on the downstream channel with a guard time that includes a normal guard time plus a differential time added thereto,
after the protection switch, perform ranging with larger overhead on the upstream channel to adjust any of the guard time and the differential time, and
reduce the larger overhead after the ranging.

10. The OLT of claim 9, wherein the guard time is larger than a guard time used by the primary OLT prior to the protection switch.

11. The OLT of claim 9, wherein the OLT and the primary OLT have different distances to the plurality of ONUs on the downstream channel, and wherein the differential time ensures there is no overlapping transmission by any ONU of the plurality of ONUs after the protection switch.

12. The OLT of claim 9, wherein the circuitry is further configured to
while the DBA function is utilized with the guard time including the differential time, adjust the differential time based on detection of actual ranges to the plurality of ONUs, in-service.

13. The OLT of claim 9, wherein the circuitry is further configured to
prior to the protection switch, receive state information from the primary OLT including registered ONUs of the plurality of ONUs.

14. The OLT of claim 9, wherein the OLT and the primary OLT are configured according to Type B PON protection.

15. An Optical Line Terminal (OLT) comprising:
a transmitter configured to connect to a plurality of Optical Network Units (ONUs) on a downstream channel;
a receiver configured to connect to the plurality of ONUs on an upstream channel; and
circuitry communicatively coupled to the transmitter and the receiver, wherein the circuitry is configured to
responsive to protection switch from a primary OLT, enable the transmitter on the downstream channel,
utilize a Dynamic Bandwidth Assignment (DBA) function on the downstream channel with a guard time that includes a normal guard time plus a differential time added thereto, and
prior to the protection switch, receive state information from the primary OLT including ranging information between the primary OLT and the plurality of ONUs, wherein the ranging information is used for the differential time.

16. The OLT of claim 15, wherein the guard time is larger than a guard time used by the primary OLT prior to the protection switch.

17. The OLT of claim 15, wherein the OLT and the primary OLT have different distances to the plurality of ONUs on the downstream channel, and wherein the differential time ensures there is no overlapping transmission by any ONU of the plurality of ONUs after the protection switch.

18. The OLT of claim 15, wherein the circuitry is further configured to
while the DBA function is utilized with the guard time including the differential time, adjust the differential time based on detection of actual ranges to the plurality of ONUs, in-service.

19. The OLT of claim 15, wherein the circuitry is further configured to
prior to the protection switch, receive state information from the primary OLT including registered ONUs of the plurality of ONUs.

20. The OLT of claim 15, wherein the OLT and the primary OLT are configured according to Type B PON protection.

* * * * *